SYSTEM FOR AUTOMATICALLY MAXIMIZING THE POWER OUTPUT OF A FREQUENCY VELOCITY-MODULATED OSCILLATOR
Filed Sept. 24, 1963

INVENTOR.
LOUIS MANDEL
BY Ernest J. Weinberger
Max L. Farmer
ATTORNEYS

Dec. 28, 1965 L. MANDEL 3,226,654

SYSTEM FOR AUTOMATICALLY MAXIMIZING THE POWER OUTPUT OF A FREQUENCY VELOCITY-MODULATED OSCILLATOR

Filed Sept. 24, 1963 5 Sheets-Sheet 2

INVENTOR.
LOUIS MANDEL
BY Ernest F. Weinberger
May D. Farmer
ATTORNEYS

Dec. 28, 1965 L. MANDEL 3,226,654

SYSTEM FOR AUTOMATICALLY MAXIMIZING THE POWER OUTPUT OF A FREQUENCY VELOCITY-MODULATED OSCILLATOR

Filed Sept. 24, 1963 5 Sheets-Sheet 3

INVENTOR.
LOUIS MANDEL
BY Ernest F. Weinberger
Ray H. Farmer
ATTORNEYS

INVENTOR.
LOUIS MANDEL
BY Ernest G. Weinberger
Max H. Farmer
ATTORNEYS

INVENTOR.
LOUIS MANDEL
BY Ernest F. Weinberger
May & Farmer
ATTORNEYS

United States Patent Office 3,226,654
Patented Dec. 28, 1965

3,226,654

SYSTEM FOR AUTOMATICALLY MAXIMIZING THE POWER OUTPUT OF A FREQUENCY VELOCITY-MODULATED OSCILLATOR

Louis Mandel, Levittown, N.Y., assignor to the United States of America as represented by the Secretary of the Navy Filed Sept. 24, 1963, Ser. No. 311,262
1 Claim. (Cl. 331—84)
(Granted under Title 35, U.S. Code (1952), sec. 266)

The invention herein described may be manufactured and used by or for the Government of the United States of America for governmental purposes without the payment of any royalties thereon or therefor.

This invention relates to high frequency oscillators and in particular to an automatic system for adjustment of the operating mode of such oscillators. The invention has particular application to the testing and evaluation of such oscillators and wide application to the proper adjustment of equipment employing such oscillators, as for example, radar units.

Broadband klystron oscillators including the reflex type are widely used in frequency modulation systems and it has been found as evidenced by the prior art that the reflector or repeller voltage must be altered as the resonant frequency of the associated cavity is changed. This is usually accomplished by means of an electrical potentiometer mechanically linked to the cavity tuning apparatus. There is in addition the problem of adjusting this voltage to obtain the maximum energy for the specific mode of operation. In general, a klystron circuit develops frequencies in excess of 1,000 mc. and thereby alleviates the requirement that the tube transmit time be limited to a small fraction of the oscillation period. Basically this is accomplished by changing the velocities of various transit electrons and causing "bunching." The bunched electrons are made to radiate or give up their energy to a resonant element (cavity) much the same as a pendulum is caused to oscillate at a regular constant frequency when periodically activated or supplied with energy. There are many parameter variations, one such prime parameter being the reflector voltage which affect the output of a klystron and its operating mode. It is a characteristic of reflex klystron oscillators that they operate in several different reflector-voltage ranges desigated as "modes" each mode extending over a particular voltage excursion. Neglecting the small frequency variation there exists for each operating mode (cavity tuning excluded) a specific reflector potential at which maximum efficiency is derived from the oscillator. In order to determine such specific potentials, considerable time and expense must be expended in manual adjustments, usually by a skilled operator. Further, where these klystrons are to be tested and evaluated in a laboratory or on a so-called tube checker, these optimum mode points must be accurately and dynamically ascertained. The present invention is therefore directed to an automatic method and system for optimizing the reflector voltage of a frequency velocity-modulated oscillator.

It is an object of this invention to provide a simple, reliable, inexpensive and automatic method and system for dynamically adjusting the optimum operating mode point of a high frequency velocity-modulated oscillator.

Another object of my invention is to provide a means for automatically and dynamically adjusting the reflector potential of a reflex klystron oscillator for any resonator tuning while maintaining a maximum R.F. output and which, additionally, may be operated properly by those unskilled in the art.

Other objects and advantages will appear from the following description of an example of the invention, and the novel features will be particularly pointed out in the appended claim.

Figure 3A:
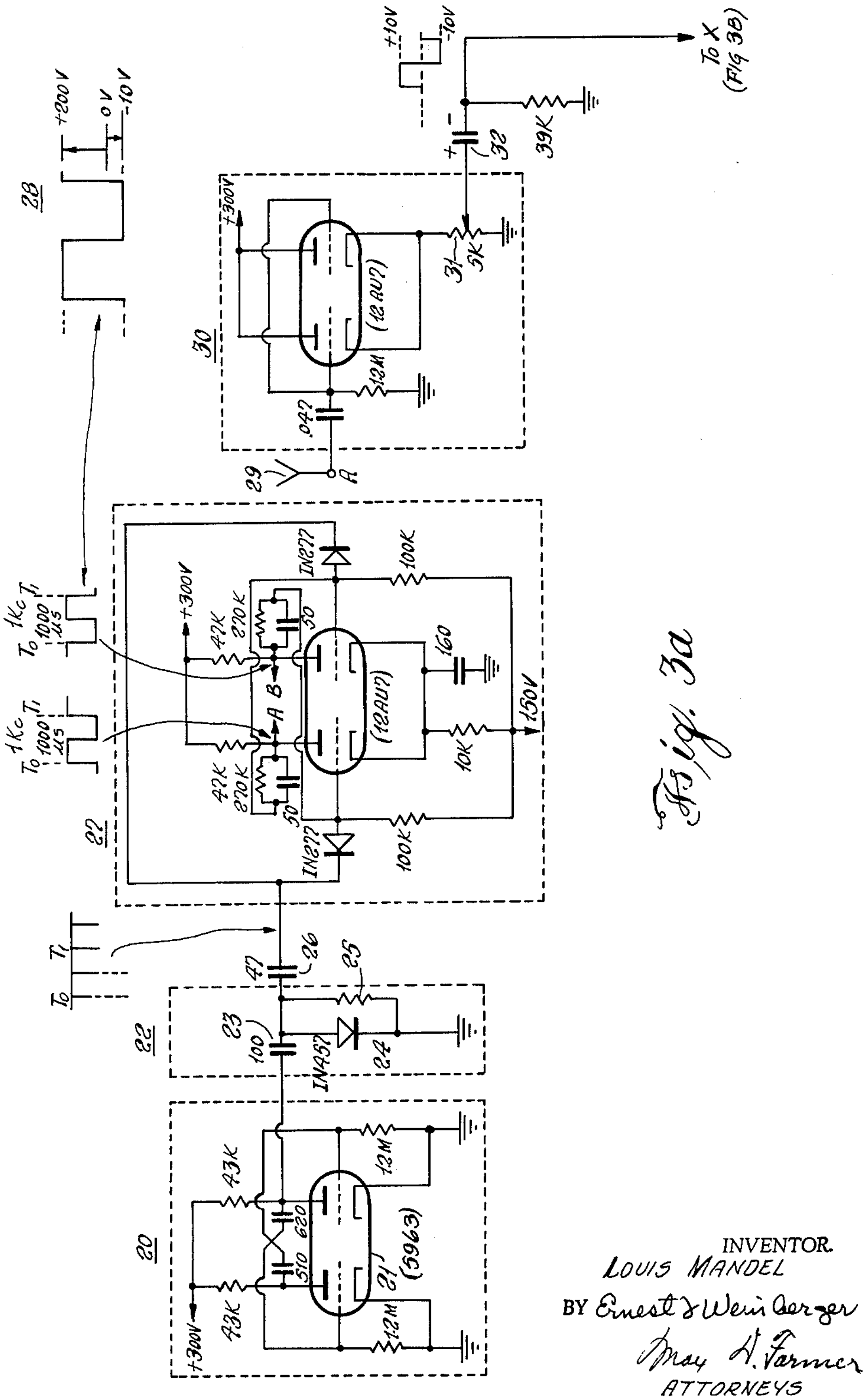

FIG. 3*a*, *b*, and *c*, are schematic diagrams of an apparatus made in accordance with the principle of this invention, and FIG. 4 is a graphic representation of a particular mode showing a typical superimposed square wave.

Figure 1:
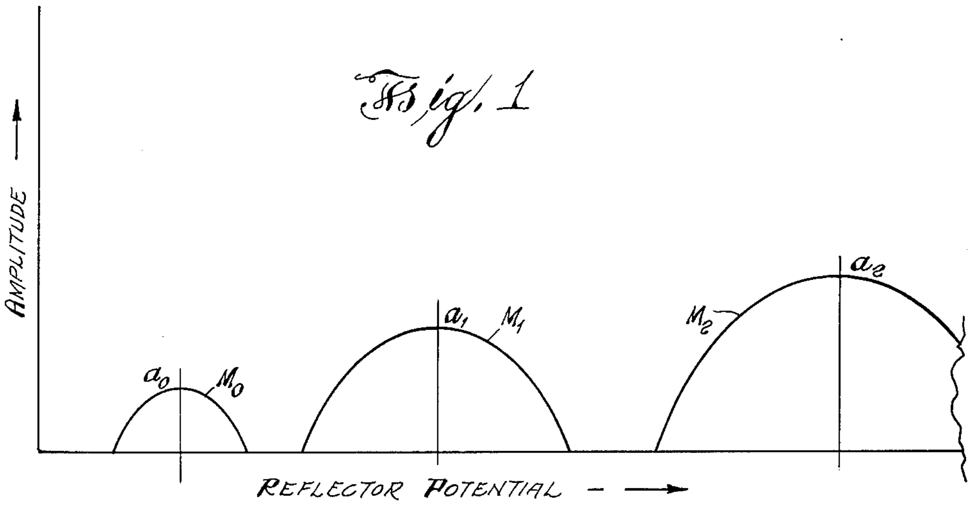
FIG. 1 is a graphic chart showing the relation between reflector potential and oscillator output amplitude.

In order to more fully appreciate and comprehend the invention herein described, it would be most helpful to briefly consider some of the basic characteristics of velocity modulated klystron oscillators. To generate sustained oscillations with a klystron oscillator it is necessary to apply to the various elements thereof specific potentials, these usually being indicated by the manufacturer of the klystron tube and comprise heater, cathode and repeller or reflector voltages. With all the other circuit parameters held constant a variation of the reflector voltage causes the klystron to oscillate only over discrete ranges of reflector potential, which ranges are conventionally designated as modes. Now referring to FIG. 1, there is illustrated a plot of repeller potential against power or signal amplitude output of the klystron. Only three modes $M_0$, $M_1$, and $M_2$ have been shown and as is clear, as the reflector potential is increased, in a negative sense, the oscillator changes within any of the selected modes to produce first a minimum signal output then increasing toward a maximum point ($a_0$, $a_1$, $a_2$) approximately at the center of the mode, and then to another minimum on the opposite end. In practice, it is necessary to "tune" the klystron to the peak output for the selected operating mode and in evaluating these klystron tubes in a laboratory it is essential that they be quickly, properly and accurately tuned. To this end, it is obvious that for each mode there exists a single optimum operating point, namely, that at which a maximum output is derived. It is with this end in view that by employing a system which automatically detects and adjusts the klystron reflector potential an oscillator may be readily evaluated.

Figure 2:
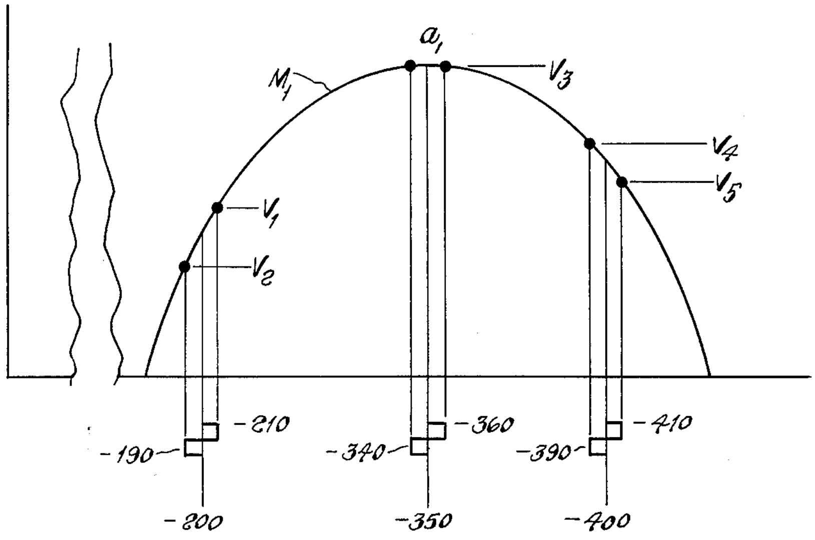
FIG. 2 is a block diagram of an embodiment made in accordance with this invention.
Figure 2:
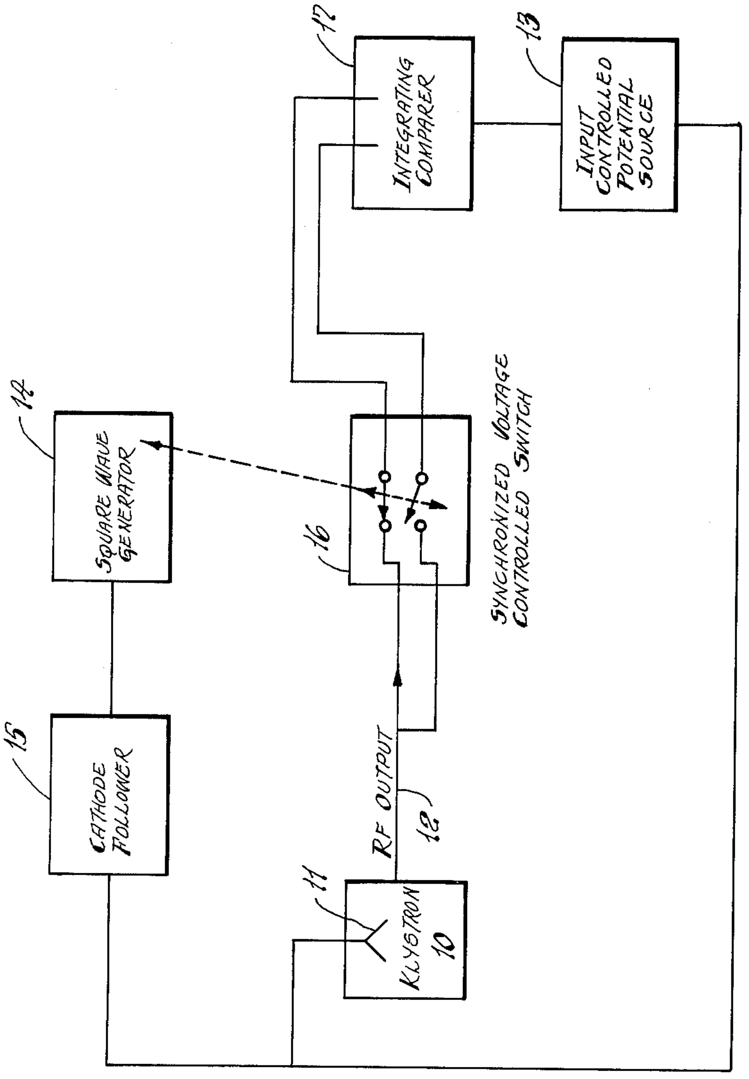

In its most basic form the embodiment of the invention as illustrated in FIG. 2 contemplates a klystron vacuum tube 10 having a reflector electrode 11 and an R.F. rectified output terminal 12. A pair of superimposed inputs are applied to the reflector electrode these being a high variable negative D.C. potential derived from source 13 and a short duration square wave signal from generator 14 via cathode follower 15. The D.C. potential of source 13 is continually increased from some low value until it reaches the proper reflector voltage for the particular selected operating mode. At the same time a low voltage square wave voltage about zero D.C. (no D.C. component) is applied to alternately vary the total D.C. at the reflector slightly above and below the high negative D.C. potential from source 13. The total affect is an approximately step-wise rise in potential with the steps of small magnitude and short duration as compared with the slowly rising source potential. As the reflector potential is so varied the output of the klystron oscillator is split into two paths and applied individually to a pair of controlled switch means 16. The controlled switch means in its simplest form can be represented as a pair of switches each of which is activated by the output of the square wave generator 14. The switches are made to act oppositely, namely, as one is closed, the other is opened. The switch means output is connected to an integrating comparator 17 where although the output of one switch occurs before the other they are compared by a standard integrating circuit. Even though the switches are connected to a single output it should be realized that the klystron output changes for each half cycle of the square wave generator, as for example, if the upper switch is synchronized with the positive half cycle its output will generally be lower than that of the other switch which is in phase opposition since the other is closed for a period when a greater negative potential is applied to the reflector electrode. This is true for the left half of the mode curve (FIG. 1) while opposite for the other half. In either case, the two outputs of the switch means 16 are always different except when they occur on opposite sides of the optimum voltage (e.g., $a_0$, $a_1$, and $a_2$). The integrator output may be the difference between these switch means inputs and as long as there exists such an output the source 13 potential is made to continually increase at a relatively slow rate. When there is no or zero integrator output, the source 13 stops increasing and is made to hold at constant value so that the optimum reflector electrode potential is being applied thereto.

Figure 3B:
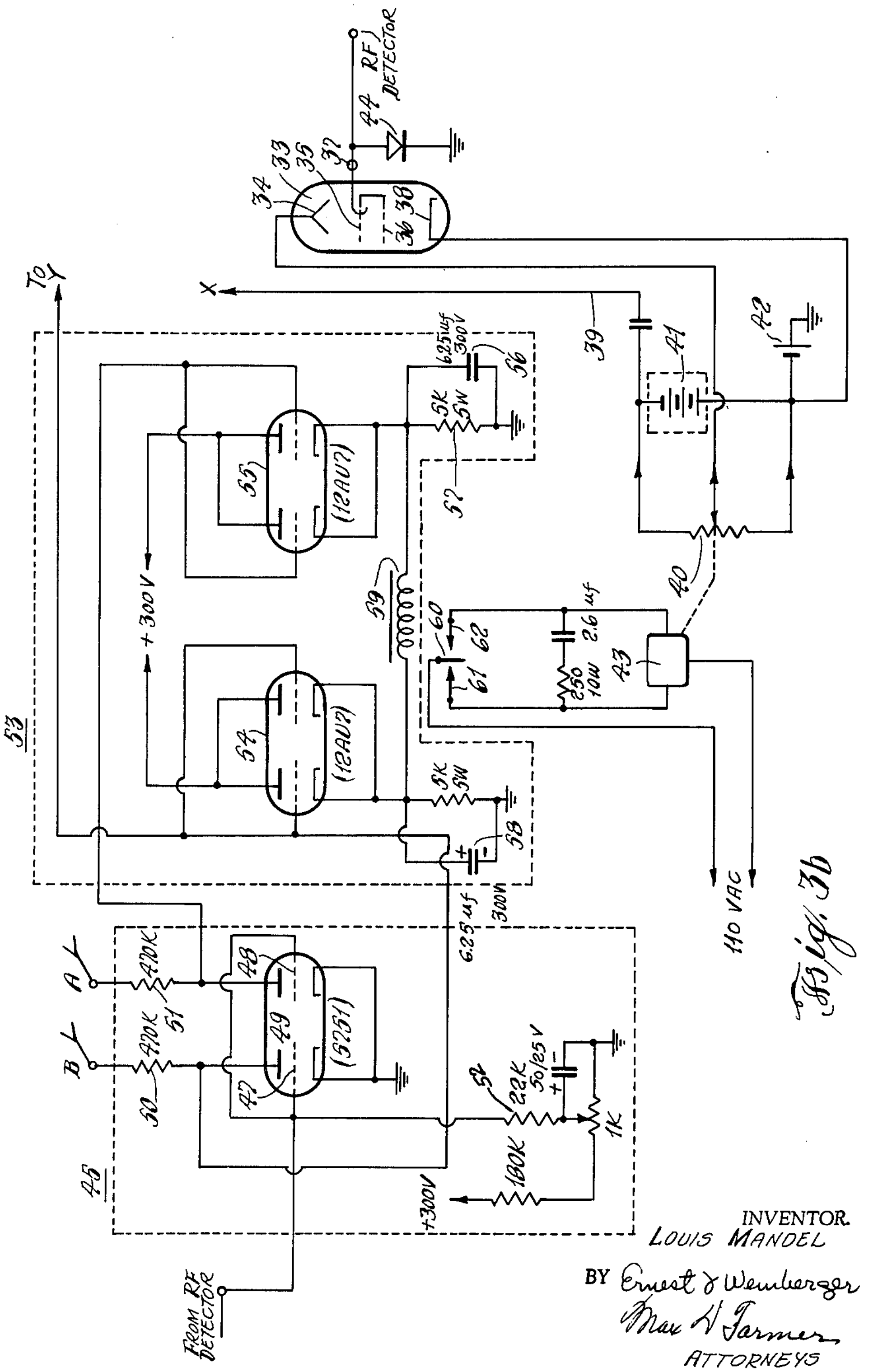
Figure 3C:
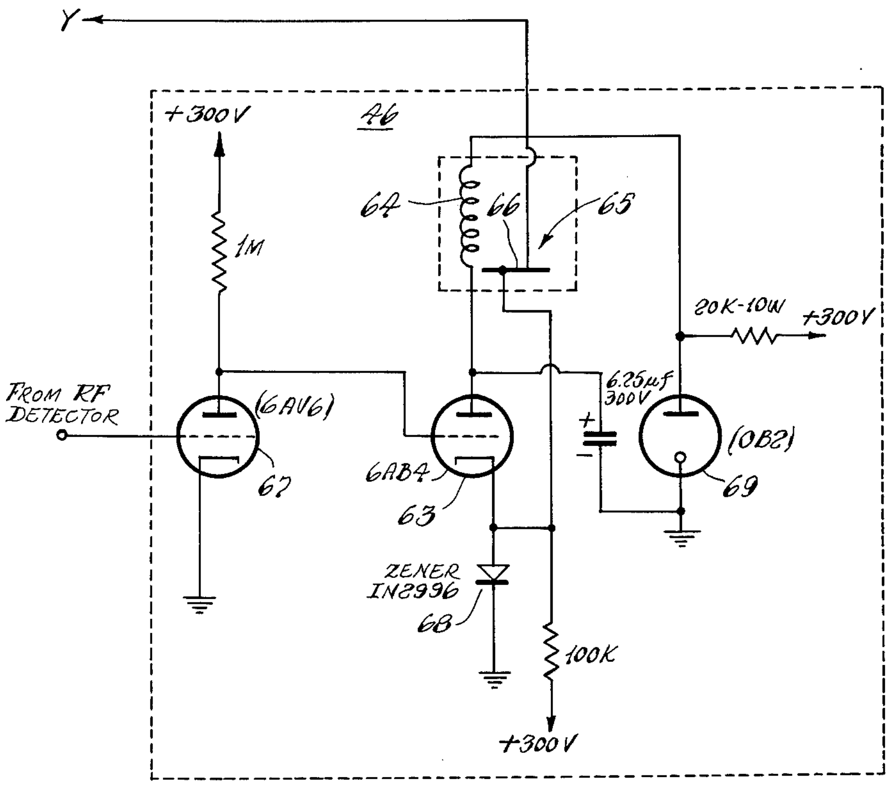

In the illustrated embodiment of the invention of FIG. 3 a standard type of pulse repetition frequency (PRF) multivibrator 20 comprising dual triode 21 with its associated circuitry produces at its output, trigger pulses at a repetition rate, for example, of 2 kc. These trigger pulses are differentiated and clipped by circuit 22 having connected therein capacitor 23 and the parallel grounded combination of rectifier 24 and resistor 25 and coupled by way of capacitor 26 to a bistable multivibrator 27, which, as is the case herein, can be of the Eccles-Jordan variety. The trigger pulses occur at 500 microsecond intervals and therefore the square wave output of the bistable multivibrator 27 will have a period of 1000 microseconds or 1 millisecond. Since the same trigger pulses are employed for both halves of the vibrator 27 the outputs designated as "A" and "B" are in phase opposition. Although the square wave outputs are symmetrical with respect to time (50% duty cycle), they are not symmetrical about a zero potential but swing from approximately minus 10 volts to plus 200 volts (see 28). The purpose of this nonsymmetry becomes evident when one considers the succeeding stage to which both outputs are simultaneously applied.

One of the square wave signals, as for example, "A" is applied to input terminal 29 of dual cathode follower 30 and provides the necessary low impedance output across cathode potentiometer 31 which is used to vary the output amplitude. This square wave output of the follower 30 is symmetrical about zero potential after passing through capacitor 32 and is employed to modulate the klystron oscillator tube 33. The klystron tube has a reflector electrode 34, a pair of buncher electrodes 35 and 36 coupled to an output terminal 37, and a beam or cathode electrode 38. These tubes being quite conventional, no detailed description thereof is necessary. The square wave modulating signal is applied to the repeller or reflector electrode 34 via line 39 and potentiometer 40. Disposed across the arms of the potentiometer 40 is a source of D.C. potential 41, such as a battery. One fixed arm of the potentiometer is connected to the cathode which is biased by a battery 42. The center or movable arm is electrically coupled directly to the reflector electrode and at the same time its shaft physically driven by a synchronous reversible motor 43 which has been appreciably geared down. A combination found suitable consisted of a 72 r.p.m. motor geared down to 3 r.p.m. so that it could start and stop within one-half a degree of shaft rotation. The potentiometer used was a ten turn pot capable of fine voltage control.

The output of the klystron tube is detected by rectifier 44 and simultaneously applied to the dual gated amplifier stage 45 and the initiating stage 46. The detected R.F. energy is applied to both grids 47 and 48 of twin triode 49 while the dual out-of-phase square waves from multivibrator 27 are applied through resistors 50 and 51 to the plates of this tube. This tube is operated as a dual gated amplifier with the grids being biased positively through isolation resistor 52, thus cancelling any undesirable grid contact potential effects. With this arrangement each half of the tube will conduct only when a high positive potential is applied to its plate and will be non-conducting at all other times. By providing a square wave plate signal having a high positive excursion (200 volts) and an opposite negative excursion, the dual gated amplifier sections each will be alternately conducting and cut off without any possible overlap so that a signal will only be present at any one time at one of the circuits of differential cathode follower stage 53 depending on which gate of amplifier 45 is made conducting by the output of stage 27. Since the initial square waves generated are in phase opposition then the triodes of gated amplifier 45 will alternately conduct and likewise the parallel tubes 54 and 55 will receive time alternate signals. As an example, consider that a 1 kc. square wave of 20 volt peak-to-peak amplitude is applied to modulate the klystron tube and at some instant potentiometer 40 is supplying a negative potential of approximately 200 volts to the reflector electrode. Under these conditions, the modulation signal for one-half cycle causes a voltage of approximately −190 volts to be impressed on the reflector electrode and a voltage of −210 for the other half cycle. While the −190 is present the right side of twin triode 49 is conducting and a signal is therefore passed through twin triode 55 resulting in a charge across the integrating capacitor 56. The charging circuit of capacitor 56 and resistor 57 has a time constant which is relatively long with respect to the period of the generated square wave so that the voltage across this capacitor 56 is retained for a period sufficient to compare it with the voltage impressed across the other integrating capacitor 58 for the second half cycle. In other words, the two integrating capacitors reflect R.F. output of the klystron for two successive pulse steps. FIG. 4 illustrates the above example in addition to the condition ($v_3$) when the optimum voltage is reached and similar voltages ($v_4$, $v_5$) on the down side.

Disposed between the integrating circuits is the coil or armature 59 of a polarized relay having a contacting arm 60 capable of assuming any one of three positions. This is a three position center stable (null seeking) relay with a center position in which neither contact terminal 61 or 62 is connected to arm 60 as shown. When, for example, the potential across one of the integrating capacitors exceeds the other, the contact arm will be moved so as to contact one of the terminals and when the potential is lower, it will contact the other. Where as when the optimum voltage is attained the potentials are equal, then the arm will be centered and not in contact with either terminal. One side of the input power is connected to the movable arm 60 while the other side is connected to the synchronous motor 43. Each of the contact terminals 61 and 62 is connected to the reversible motor so as to control its direction of shaft rotation. If we start at some low negative potential value (left side of mode curve of FIG. 4), then the arm 60 will contact say terminal 61 and the motor shaft will rotate in a direction so as to negatively increase this potential by turning potentiometer 40. If we start on the right side, the current through coil 59 will be in the opposite direction causing arm 60 to engage terminal 62 and thereby drive potentiometer 40 to decrease the potential and likewise approach the optimum voltage $v_3$. The relay comparator circuit produces a null sensing condition in which the synchronous motor is made to rotate in a direction to self seek the optimum voltage.

Considering the situation when there is no detected input to the dual gated amplifier 45, as would be the case when the D.C. potential at the reflector electrode lies outside of any particular mode, the contact arm 60 would not be deflected and the motor would not rotate. It is therefore necessary to initiate and maintain the motor drive until a detected R.F. signal is present. Triode 63 is operated in its cutoff region so that normally no current flows in the coil 64 of normally closed relay 65 which is in the plate circuit of this triode 63. The relay is thus in its de-energized state and as illustrated with its contacts 66 closed. These contacts are in circuit with a source of positive applied clamp potential, which, when the contacts are closed, supplies a potential to the plate of one of the sections of the dual gated amplifier to cause that section to conduct even without an R.F. detected input. This unbalance is reflected into the comparator circuit 53 where the relay is activated and the motor caused to rotate. When, however, sufficient detected R.F. is present at the grid of triode 67, the conduction of this tube is severely decreased due to the fact that the detected signal is negative (see diode 44). This action increases the plate voltage on tube 67, which increase is coupled to the grid of triode 63 and results in greater conduction, in fact, sufficient to energize relay 65 and cutoff the applied clamp potential voltage at the gated amplifier. The Zener diode 68 and gas tube 69 are employed to regulate current and voltage at triode 63.

Summarizing the overall method, it is clear that one could apply an incrementally increasing or changing potential to the reflector electrode of a klystron oscillator. This may be by superimposing a square wave, sine wave or merely a step or staircase voltage on to a slowly increasing high reflector potential. Then detecting the high frequency oscillation output of the klystron. Subsequently comparing the magnitudes of the detected output for successive incremental potentials. Then controlling the slowly changing high potential to remain fixed when the detected magnitudes for two successive increments are equal.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

An automatic system for optimizing the mode adjustment of a reflex klystron oscillator including a reflector electrode and having an R.F. output detector connected to the output of said klystron oscillator which comprises:

(a) a square wave generator having a pair of outputs which are in phase opposition, (b) a cathode follower connected between said reflector electrode and one of said square wave generator outputs, (c) a dual gated amplifier circuit having a pair of inputs and a pair of outputs and each set capable of being inactivated when a potential of a particular polarity is applied to an element thereof, (d) means connecting said generator outputs to said amplifier for controlling the activation of the same and connecting said detector to said amplifier, (e) a differential cathode follower circuit connected to receive the outputs of said dual amplifier and producing an output only when the levels of said outputs are of different amplitudes, (f) a motor driven potential divider electrically coupled to said electrode, (g) a source of D.C. potential connected across said divider, (h) a relay having contacts connected to supply motive energy to said divider and thereby control the activity of said divider, said relay connected to activate its contacts only upon receiving an output from said differential cathode follower.

References Cited by the Examiner

UNITED STATES PATENTS

| | | | |
|---|---|---|---|
| 2,527,730 | 10/1950 | Hoglund | 331—84 |
| 2,583,023 | 1/1952 | Spangenberg | 331—6 |
| 2,924,785 | 2/1960 | Sharp | 331—84 |

ROY LAKE, *Primary Examiner.*

JOHN KOMINSKI, *Examiner.*

JAMES B. MULLINS, *Assistant Examiner.*